US010080343B1

(12) United States Patent
Chu

(10) Patent No.: US 10,080,343 B1
(45) Date of Patent: Sep. 25, 2018

(54) PET MONITORING AND RECOMMENDATION SYSTEM

(71) Applicant: Ewig Industries Macao Commercial Offshore Limited, Hong Kong (CN)

(72) Inventor: Luk Wah Jackson Chu, Hong Kong (CN)

(73) Assignee: Ewig Industries Macao Commercial Offshore Limited, Macau (CN)

( * ) Notice: Subject to any disclaimer, the term of this patent is extended or adjusted under 35 U.S.C. 154(b) by 0 days.

(21) Appl. No.: 15/469,775

(22) Filed: Mar. 27, 2017

(51) Int. Cl.
 G08B 23/00 (2006.01)
 A01K 1/00 (2006.01)
 G01S 1/00 (2006.01)

(52) U.S. Cl.
 CPC . *A01K 1/00* (2013.01); *G01S 1/00* (2013.01)

(58) Field of Classification Search
 CPC .................................. A01K 1/00; G01S 1/00
 See application file for complete search history.

(56) References Cited

U.S. PATENT DOCUMENTS

2015/0342143 A1* 12/2015 Stewart ................ A01K 5/0275
 119/51.02
2016/0015004 A1* 1/2016 Bonge, Jr. ............ A01K 27/009
 119/718

* cited by examiner

Primary Examiner — Shirley Lu
(74) Attorney, Agent, or Firm — Lathrop Gage LLP

(57) ABSTRACT

A pet monitoring system includes a pet activity server having a pet database defining preliminary schedule for a variety of pets. A pet owner can obtain the preliminary schedule via an owner device and customize configuration settings for one or more pet devices based on the preliminary schedule and one or more modifications made thereto by the owner. The modifications may be based on modifications made to the preliminary schedule by additional owners and stored within the pet activity server within a community database. In certain aspects, the pet devices may automatically control one another based on the pet's interaction with a given device.

6 Claims, 7 Drawing Sheets

FIG. 1

PET MONITORING AND RECOMMENDATION SYSTEM

BACKGROUND

Pet owners have strong desires to maintain healthy pet lifestyles. This can be difficult when the owner(s) are away from the pet. Moreover, when owner(s) are away from the pet, the pet may have separation anxiety causing the pet's health to degrade.

SUMMARY OF THE EMBODIMENTS

In an aspect, a pet monitoring system, includes a pet activity server including a pet database defining preliminary schedule for a variety of pets. An owner device may be in communication with the pet activity server, the owner device may execute a pet application. The preliminary schedule may be for a specific pet of the variety of pets accessible by the pet application and modifiable based on owner modifications obtained at the owner device via interaction by the owner with the pet application. A pet device may include configuration settings, the configuration settings may be based on the preliminary schedule and the owner modifications.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Systems and methods herein solve numerous disadvantages in the prior art. The embodiments disclosed allow pet owners to customize pet monitoring device(s) such that the pet's lifestyle and health may be optimized according to the owner(s) wishes. The embodiments provide flexible and customizable settings such that the owner may take a standardized health program and alter according to current pet status. Moreover, by coupling the embodiments herein with a remote server, overall flexibility of the systems and methods is increased such that any standard pet monitoring and interaction device may be configured according to the specific pet. In addition, the server may accumulate information on a plurality of owners such that the system may provide accurate advice for a given species, breed, weight, etc. of pet.

Figure 1:
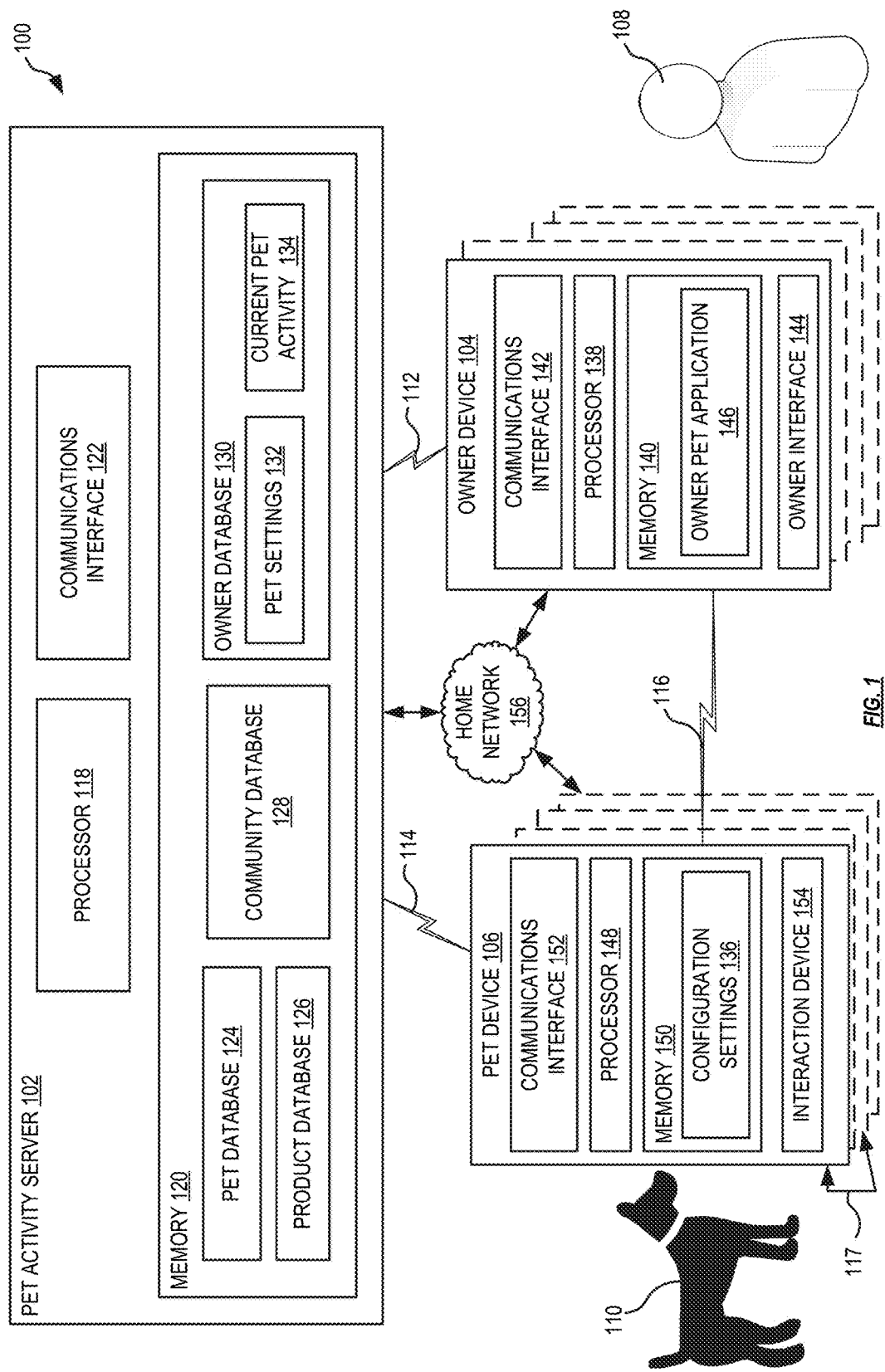
FIG. 1 depicts a pet monitoring and recommendation system 100, in embodiments.

FIG. 1 depicts a pet monitoring and recommendation system 100, in embodiments. System 100 includes a pet activity server 102 in communication with at least one owner device 104 over a first communication path 112. In embodiments, pet activity server 102 may further in communication with at least one pet device 106 over a second communication path 114. Second communication path may include a WiFi network (router) configured within the owner's dwelling. Each pet device 106 may be in communication with the owner device 104 via a third communication path 116. In addition, specific types of pet devices 106 may be in communication with other pet devices 106 via a fourth wireless communication path 117.

Each of first, second, third, and fourth communication paths 112, 114, 116, and 117 respectively, may be implemented via a wired or wireless communication protocol, or a combination thereof. For example, a wired communication protocol may include any one or more of Ethernet, cable, fiber optic, telephonic, USB, or other hard-wired communication link. A wireless communication protocol may include any one or more of Bluetooth, Bluetooth Low Energy (BLE), Zigbee, Wi-Fi, Cellular (3G, 4G, 5G, LTE, LTE-U, NB, etc.), or otherwise radio frequency, or any other wireless communication link. In embodiments, each of first, second, third, or fourth communication paths 112, 114, 116, and 117 may form a direct line of communication between two components of system 100, or may be indirect such as through a wireless home network 156 as shown in FIG. 1.

Pet activity server 102 may be a centralized server (or group of servers) located on the "cloud" and adapted to accumulate information regarding any number of variety of pets (i.e. species, breeds, weights, male/female, etc.). A pet owner 108 may interact with owner device 104 to obtain preliminary information regarding a pet 110 from server 102. The pet owner 108 may then alter the preliminary information to set a desired pet facial recognition/monitoring/food intake estimation/feeding/activity schedule which is then used to configure the one or more pet device 106. The pet device 106 then interacts with the pet 110 and transmits information regarding said interaction to either pet activity server 102 or owner device 104.

Pet activity server 102 may include a processor 118 coupled with memory 120, and a communications interface 122.

Processor 118 may be one or more processing devices capable of executing transitory and or non-transitory computer readable instructions stored within memory 120, and otherwise implementing/controlling functionality of pet activity server 102 discussed herein.

In embodiments, communications interface 122 may implement a wired or wireless communication protocol, or a combination thereof, as discussed above with respect to first, second, third, and fourth communication paths 112, 114, 116, and 117 respectively.

Memory 120 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory (either as a single memory device, or multiple memory devices).

Memory 120 may store one or more of a pet database 124, product database 126, community database 128, and owner database 130. Pet database 124 may include activity, feeding, food intake estimation, pet facial identification database, health, and other statistical and schedule information and be organized by pet species, breed, sex, weight, height, or other characteristic. For example, pet database 124 may accumulate a preliminary recommended pet feeding schedule and/or activity (e.g. exercise) schedule as obtained from the global pet institute, or other sources such as the Banfield Pet Hospital.

Product database 126 may include information, such as nutrition information, ingredients, expiration date, etc. of various products used throughout system 100.

Community database 128 may include information about multiple owners within system 100. For example, community database 128 may include various configuration settings, prescriptions, health regimens, dietary information that owners enact while using system 100. Accordingly, pet activity server 102 allows a given owner to manipulate the preliminary information from pet database 124, and product database 126, with real-life examples based on the information within community database 128. In embodiments, community database 128 is an aggregation of each individual owner's owner database 130. Community database 128 may be utilized to gather data to come up with an average based on most popular modifications to the information within pet database 124 and product database 126.

Owner database 130 may include information, specific to each owner 108, for operation of the owner's system 100. For example, owner database 130 may include pet settings 132, and current pet activity 134. Pet settings 132 may include a plurality of configuration settings 136 for operating each pet device 106. Configuration settings 136 are discussed in more detail below. Owner database 130 may also include the owner's stock record of pet treat and food at home. For example, by monitoring the stock level in storage, the owner database 130 can transmit alerts to device 104 when the owner database 130 indicates that the pet food and treats are out of stock, owner shall place the order for per food/treat or generate the shopping list for next visit to pet shop. Current pet activity 134 may include data received from pet device 106 over second communication channel 114 identifying (and in some cases including) a pet 110 interaction with pet device 106. Specific examples of current pet activity 134 are described in more detail below. Owner database 130 may also be compared to various information to identify when the pet 110 is healthy and/or sick. For example, by comparing daily food/water intake, exercise/activities, rest/sleeping time, weight data against community data, the owner database 130 can transmit alerts to device 104 when the owner database 130 indicates that pet 110 is not in tune with the averages as defined by community database 128 (and/or pet database 124).

Owner device 104 may be any device, such as a smartphone, computer, TV, tablet, laptop, smartwatch, etc. capable of interaction with owner 108. Owner device 104 may include a processor 138 in communication with memory 140, a communications interface 142, and an owner interface 144.

Processor 138 may be one or more processing devices capable of executing transitory and or non-transitory computer readable instructions stored within memory 140, and otherwise implementing/controlling functionality of owner device 104 discussed herein.

In embodiments, communications interface 142 may implement a wired or wireless communication protocol, or a combination thereof, as discussed above with respect to first, second, third, and fourth communication paths 112, 114, 116, and 117 respectively.

Memory 140 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory (either as a single memory device, or multiple memory devices). In embodiments, processor 138 and memory 140 may operate based on an operating system, and in embodiments said operating system may be an Android operating system or an Apple iOS operating system.

Memory 140 may include an owner pet application 146. Owner 108 may interact with owner pet application 148, via owner interface 144, to control various aspects of system 100, such as each pet device 108 used by owner. Additional details of owner pet application 146 are discussed in further detail below.

Owner interface 144 may enable owner 108 to interact with owner device 104. For example, owner interface 144 may be one or more of a remote, a touchscreen display, a display, a mouse/keyboard, microphone, speaker, camera, sensor, transducer or any other device capable of receiving and sending information (and interacting with) owner 108.

Pet device 106 may be any device, such as a feeder, scale, water fountain, trainer (e.g. ball launcher or other toy), or activity monitor (e.g. GPS, vitals monitor, etc.) capable of interacting with pet 110. Pet device 106 may include a processor 148 in communication with memory 150, a communications interface 152, and a pet interface 154.

Processor 148 may be one or more processing devices capable of executing transitory and or non-transitory computer readable instructions stored within memory 150, and otherwise implementing/controlling functionality of pet device 106 discussed herein.

In embodiments, communications interface 152 may implement a wired or wireless communication protocol, or a combination thereof, as discussed above with respect to first, second, and t third, and fourth communication paths 112, 114, 116, and 117 respectively.

Memory 150 may include one or both of volatile (e.g. RAM, DRAM, SRAM, etc.) or non-volatile (e.g. ROM, PROM, EEPROM, NVRAM, flash memory, solid-state storage, optical or hard disk drives, etc.) memory (either as a single memory device, or multiple memory devices).

Memory 150 may store configuration settings 136. Configuration settings 136 may be based on one or more of pet database 124, product database 126, community database 128, and owner database 130. In embodiments, configuration settings 136 are for example based on preliminary information downloaded or otherwise accessed by owner 106 via owner device 104 that have been modified based on the owner's specific preferences. For example, an owner 108 may modify a recommended food regimen, such as one downloaded from pet database 124, based on the owner's preferences. The owner's preferences may further be based on information gleaned from community database 128, such as modifications typically made by other owners to the given preliminary information. Accordingly, configuration settings 136 provide the advantage of taking a standard pet device 106 and modifying it to fit a specific pet according to the owner's desires. Therefore, this provides a "one size fits all" approach where any pet device 106 may be used with any pet, regardless of species, breed, weight, sex, etc.

Interaction device 154 may be any device capable of interacting with the pet 110. For example, interaction device 154 may be a camera (including a daylight and/or night vision camera) capable of recording an image or video of the pet 110 or performing pet facial identification for special care (if required). Interaction device 154 may be a microphone and/or speaker capable of receiving data from owner 108 via owner interface 144, third communication channel 116 (and/or through pet activity server 102 via first and second communication channels 112, 114 and/or via first, second and fourth communication channel 112, 114, 117) and relaying said data to pet 110, even if owner 108 is remotely located from pet 110. In embodiments, interaction device 154 may include pet facial recognition such that it recognizes which pet is interacting with the device 106. Therefore, settings of device 106 associated with the specific pet 110 that is interacting with device 106 may be implemented. Accordingly, each device 106 is not only tailored for a specific pet, but also tailored for multiple pets and each individual settings therefore.

Figure 2:
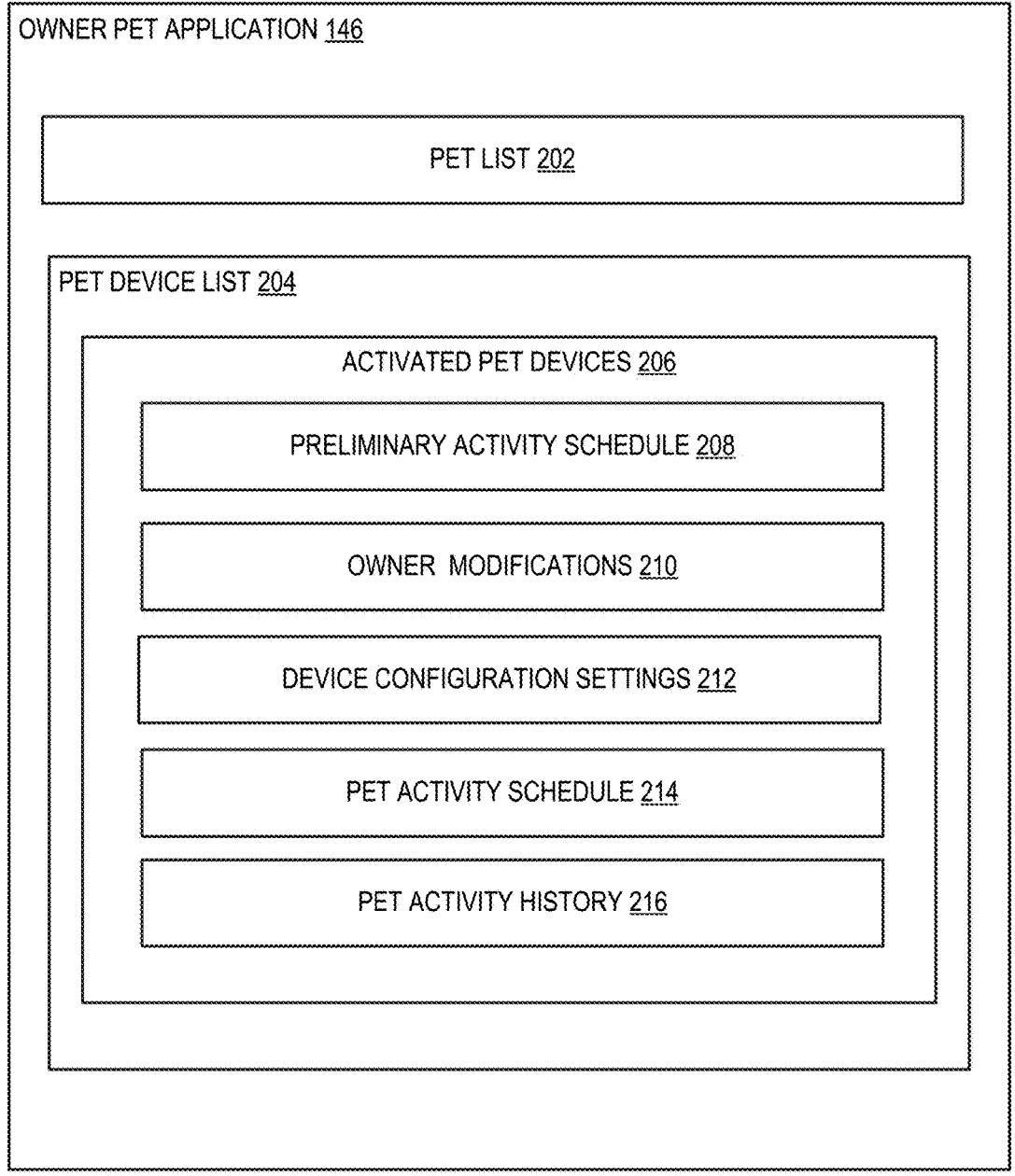
FIG. 2 depicts the owner pet application of FIG. 1, in greater detail, in embodiments.

FIG. 2 depicts owner pet application 146, of FIG. 1, in greater detail, in embodiments. Owner pet application 146 may include a pet list 202 and a pet device list 204. Pet list 202 may be a record and facial identification data of each pet 110 owned by owner 108. Facial identification data may include information regarding the face (or other parts of the pet) to identify the individual pet. Facial identification data may be collected by the pet owner by using the devices in system 100 including an interaction device 154 such as a camera. Facial identification data may include raw data such as face size, hair color, eye color, and pet size, as well as other identifying data.

Pet device list 204 may be a record of each device 106 owned by owner 108. In embodiments, pet device list 204 may be specific to each pet device 106 that is associated with a given pet 110. For example, if a pet 110 has a specific food feeder device (e.g. device 106), then, within application 146, when owner 106 selects pet 110 that specific pet's food feeder device, along with any other devices associated with the given pet, will be visible on owner device 104. It should be appreciated that, in some cases, a device may be associated with multiple pets.

Accordingly, pet device list 204 may include an activated pet device list 206, which lists each device 106 associated with a given pet 110. For each activated pet device 206, there may be a preliminary activity schedule 208, owner modifications 210, device configuration settings 212, pet activity schedule 214, and pet activity history 216.

Preliminary activity schedule 208 may be a preliminary regimen, such as feeding, activity, training, weight, etc., for the given pet. For example, preliminary activity schedule 208 may be downloaded from pet activity server 102 via first communication channel 112. In embodiments, preliminary activity schedule 208 is one or more of information obtained from pet database 124 and product database 126. For example, preliminary activity schedule 208 may be a feeding schedule for a given breed based on pet database 124 according to the calories for a given food product as defined within product database 126.

Owner modifications 210 may be a set of changes to the preliminary activity schedule 208. For example, an owner may indicate to feed his/her pet more than identified within the preliminary activity schedule 208. In embodiments, owner modifications 210 may be based on, or defined by, typical modifications may be other owners as defined in community database 128.

Device configurations settings 212 may be a set of control instructions that are sent to pet device 106 from owner device 104 based upon one or both of preliminary activity schedule 208 and owner modifications 210. In embodiments, device configuration settings 212 are the same as configuration settings 136 discussed above. As such, system 100 has the advantage that any device 106 may be a "dummy device" in the sense that it has no primal knowledge of the recommended activity (i.e. feeding, training, monitoring, etc.) schedule for the given pet 110. However, once installed with device configuration settings 212, the device 106 is altered to a "smart device" in that it is customized for the given pet 110 and according to the owner's 108 desires.

Pet activity schedule 214 may be a list of future events that are scheduled to occur for each given device associated with each given pet. For example, if a pet 110 is scheduled to be fed twice a day for the next month, pet activity schedule 214 may define such feeding schedule.

Pet activity history 216 may be a list of past events that have occurred for each given device associated with each given pet. In embodiments, pet activity history 216 may include information obtained by pet 110 interacting with interaction device 154, such as a video, image, audio clip, current weight, etc. In embodiments, pet activity history 216 may indicate operation of device 106, for example pet device 106 implemented X amount of feedings at certain times. As another example, trainer pet device played with pet 110 for a certain period of time. As another example, activity monitor pet device recorded these vitals and/or this location of pet 110 at given times.

Figure 3:
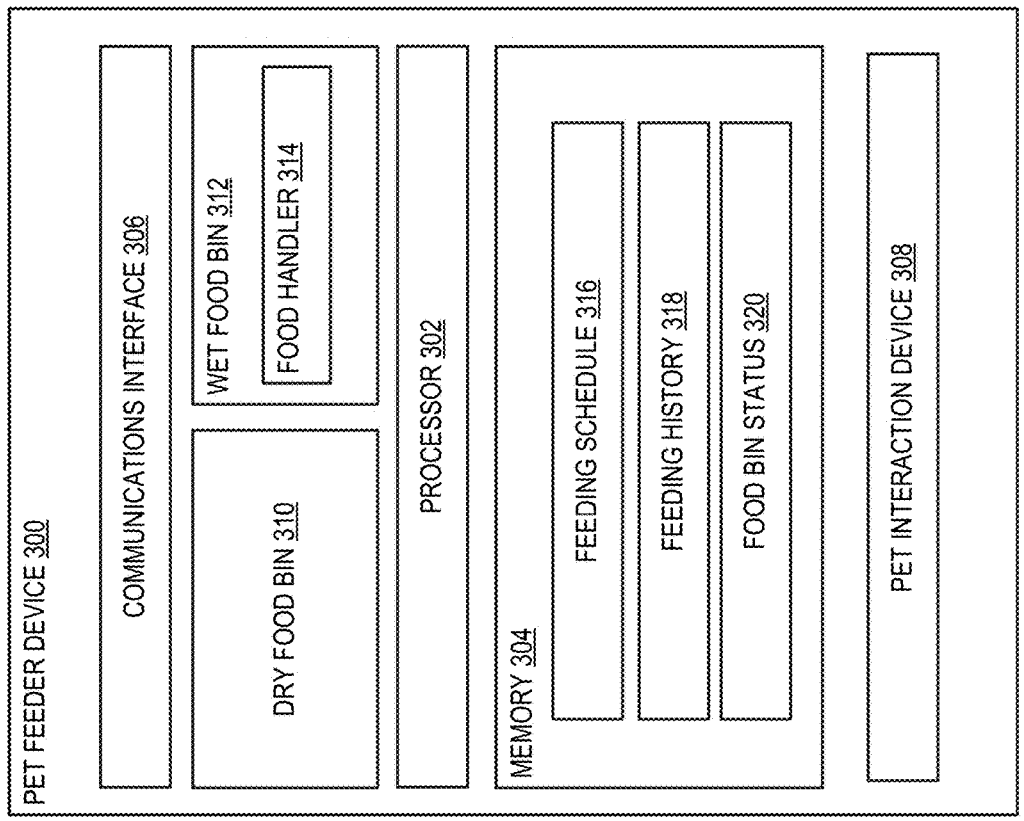
FIG. 3 depicts an exemplary pet feeder device, which is an example of the pet device of FIG. 1, in embodiments.

FIG. 3 depicts an exemplary pet feeder device 300, which is an example of pet device 106 of FIG. 1, in embodiments. Pet feeder device 300 includes a processor 302 in communications with a memory 304, a communications interface 306, and a pet interaction device 308. Processor 302 is an example of processor 148 discussed above. Memory 304 is an example of memory 150 discussed above. Communications interface 306 is an example of communications interface 152 discussed above. Pet interaction device 308 is an example of pet interaction device 154 discussed above. In embodiments, pet interaction device 308 may be a camera capable of filming (image and/or video) the pet eating.

Pet feeder device 300 may further include one or both of a dry food bin 310, and a wet food bin 312. Dry food bin 310 may include (not shown) a turnstile or measurement system for manipulating the amount of food dispensed into a feeding section that the pet 110 is capable of eating from. Wet food bin 312 may include a food handler 314 adapted to manipulate the wet food. For example, food handler 314 may be a can opener capable of opening a can of wet food. Dry food bin 310, and wet food bin 312, may each, or collectively, have a measurement system capable of determining how much food is loaded into, or remaining in the bin.

Memory 304 may store one or more of a feeding schedule 316, feeding history 318, and food bin status 320. Feeding schedule 316 is an example of configuration settings 136, discussed above, and may be a customized setting according to the owner's 108 desires based on the breed of pet 110. Feeding schedule 316 may be a modified preliminary schedule based on one or more of pet database 124, product database 126 and community database 128.

Feeding history 318 may be a list of past feedings to pet 110. In embodiments, feeding history 318 may include information obtained from pet interaction device 308, such as an image, video, sound clip, or other interaction with pet 110. Feeding history 318 may be transmitted, via communications interface 306, to owner device 104 via third communication channel 116 (and/or through other pet devices 106 that are connected in same home network and System 100 via fourth and third communication channel 117, 116). In embodiments, feeding history 318 may be transmitted to pet activity server 102 via second communications channel 114 for storage within owner database 130 as current pet activity 134 (and optional transmission to owner device 104 via first communication channel 112 or third communication channel 116 for storage as pet activity history 216.

Figure 4:
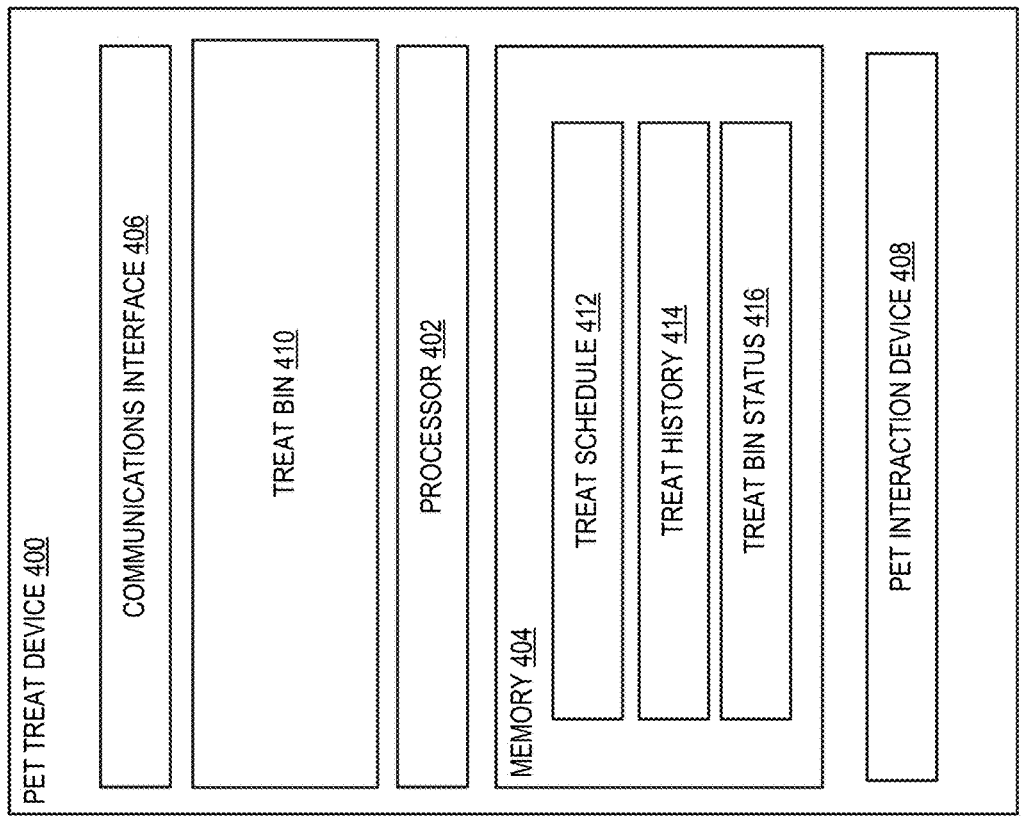
FIG. 4 depicts an exemplary pet treat device, which is an example of the pet device of FIG. 1, in embodiments.

Food bin status 320 may be an indication of how much food is within one or both of dry food bin 310 and wet food bin 312, it may also collect the owner's home stock record of pet treat and food from Owner database 130 at server. For example, a measurement system may weigh food therein and provide an indication of the remaining food left. In embodiments, food bin status 320 may be transmitted to owner device 104 for notification that the pet feeder device 300 needs to be refilled when food bin status 320 indicates that the amount of food is below a predefined threshold (e.g. two feedings remaining). Notification may include alerts to remind the owner to place the order for per food/treat or generate the shopping list for next visit to pet shop FIG. 4 depicts an exemplary pet treat device 400, which is an example of pet device 106 of FIG. 1, in embodiments. Pet treat device 400 includes a processor 402 in communications with a memory 404, a communications interface 406, and a pet interaction device 408. Processor 402 is an example of processor 148 discussed above. Memory 404 is an example of memory 150 discussed above. Communications interface 406 is an example of communications interface 152 discussed above. Pet interaction device 408 is an example of pet interaction device 154 discussed above. In embodiments, pet interaction device 408 may be a camera capable of filming (image and/or video) the pet eating, or performing pet facial identification to feed special treat for specific pet (if required).

Pet treat device 400 may further include a treat bin 410. Treat bin 410 may include (not shown) a turnstile or measurement system for manipulating the amount of treats dispensed into a feeding section that the pet 110 is capable of receiving a treat from. Treat bin 410 may have a measurement system capable of determining how many treats are loaded into, or remaining in the bin 410. For example, the measurement system may be a scale for measuring treat weight, or IR sensor/receiver that, when the IR transmitted is not received by the receiver, indicates a threshold level of treats. For example, the IR transmitter may be a certain height, and knowledge of the thickness of each treat can be used to determine the amount of treats within the treat bin 410.

Memory 404 may store one or more of a treat schedule 412, treat history 414, and treat bin status 416. Treat schedule 412 is an example of configuration settings 136, discussed above, and may be a customized setting according to the owner's 108 desires based on the breed of pet 110. Treat schedule 412 may be a modified preliminary schedule based on one or more of pet database 124, product database 126 and community database 128.

Treat history 414 may be a list of past treat offerings to pet 110. In embodiments, treat history 414 may include information obtained from pet interaction device 408, such as an image, video, sound clip, or other interaction with pet 110. Treat history 414 may be transmitted, via communications interface 406, to owner device 104 via third communication channel 116 (and/or through other pet devices 106 that are connected in same home network and System 100 via fourth and third communication channel 117, 116). In embodiments, treat history 414 may be transmitted to pet activity server 102 via second communications channel 114 for storage within owner database 130 as current pet activity 134 (and optional transmission to owner device 104 via first communication channel 112 or third communication channel 116 for storage as pet activity history 216).

Treat bin status 416 may be an indication of how many treats are within treat bin 410. In embodiments, treat bin status 416 may also collect the owner's home stock record of pet treats and food from owner database 130 at the server 102. For example, a measurement system may weigh treats therein and provide an indication of the remaining treats left. In embodiments, treat bin status 416 may be transmitted to owner device 104 for notification that the treat feeder device 400 needs to be refilled when treat bin status 416 indicates that the amount of food is below a predefined threshold (e.g. a few treats remaining), and in embodiments the notification may include alerts to remind the owner to place the order for per food/treat or generate the shopping list for next visit to pet shop.

Figure 5:
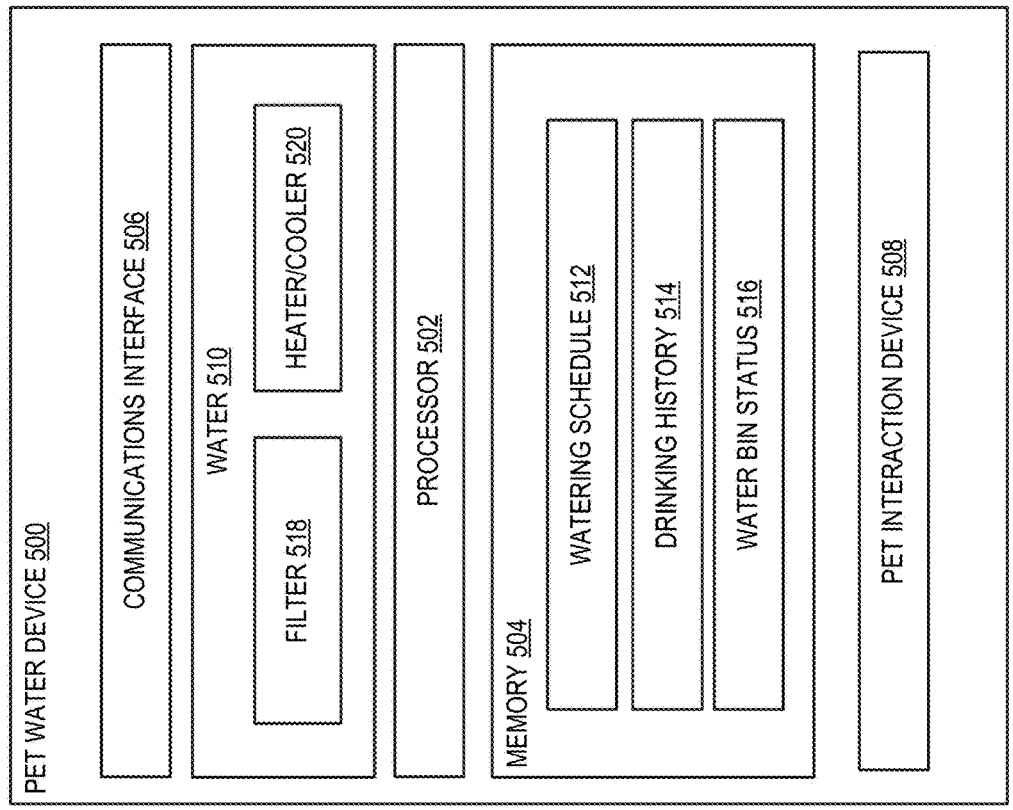
FIG. 5 depicts an exemplary pet water device, which is an example of the pet device of FIG. 1, in embodiments.

FIG. 5 depicts an exemplary pet water device 500, which is an example of pet device 106 of FIG. 1, in embodiments. Pet water device 500 includes a processor 502 in communications with a memory 504, a communications interface 506, and a pet interaction device 508. Processor 502 is an example of processor 148 discussed above. Memory 504 is an example of memory 150 discussed above. Communications interface 506 is an example of communications interface 152 discussed above. Pet interaction device 508 is an example of pet interaction device 154 discussed above. In embodiments, pet interaction device 508 may be a camera capable of filming (image and/or video) the pet drinking.

Pet water device 500 may further include a water bin 510. Water bin 510 may include (not shown) a pump for manipulating the amount of water dispensed, and otherwise circulating water, into/through a drinking section that the pet 110 is capable of drinking from. Water bin 510 may have a measurement system capable of determining how much water is loaded into, or remaining in the bin 510. For example, the measurement system may be a scale for measuring weight, or liquid sensor that indicates a threshold level of water. Water bin 510 may include a water filer 518 for purifying the water therein, such as a carbon filter. Water bin 510 may also include a heater and/or cooler 520 for controlling the temperature of the water within water bin 510.

Memory 504 may store one or more of a watering schedule 512, drinking history 514, and water bin status 516. Watering schedule 512 is an example of configuration settings 136, discussed above, and may be a customized setting according to the owner's 108 desires based on the breed of pet 110. Water schedule 512 may be a modified preliminary schedule based on one or more of pet database 124, product database 126 and community database 128. Water schedule 512 may, for example, define the temperature settings for controlling heater/water cooler 520.

Drinking history 514 may be a list of past drinking events by pet 110. In embodiments, drinking history 514 may include information obtained from pet interaction device 508, such as an image, video, sound clip, or other interaction with pet 110. Drinking history 514 may be transmitted, via communications interface 506, to owner device 104 via third communication channel 116 (and/or through other pet devices 106 that are connected in same home network and System 100 via fourth and third communication channel 117, 116). In embodiments, drinking history 514 may be transmitted to pet activity server 102 via second communications channel 114 for storage within owner database 130 as current pet activity 134 (and optional transmission to owner device 104 via first communication channel 112 or third communication channel 116 for storage as pet activity history 216).

Water bin status 516 may be an indication of how much water is within water bin 510. For example, a measurement system may weigh the water therein and provide an indication of the remaining water left. In embodiments, water bin status 516 may be transmitted to owner device 104 for notification that the water device 500 needs to be refilled when water bin status 516 indicates that the amount of water is below a predefined threshold (e.g. number of ounces/liters remaining).

Figure 6:
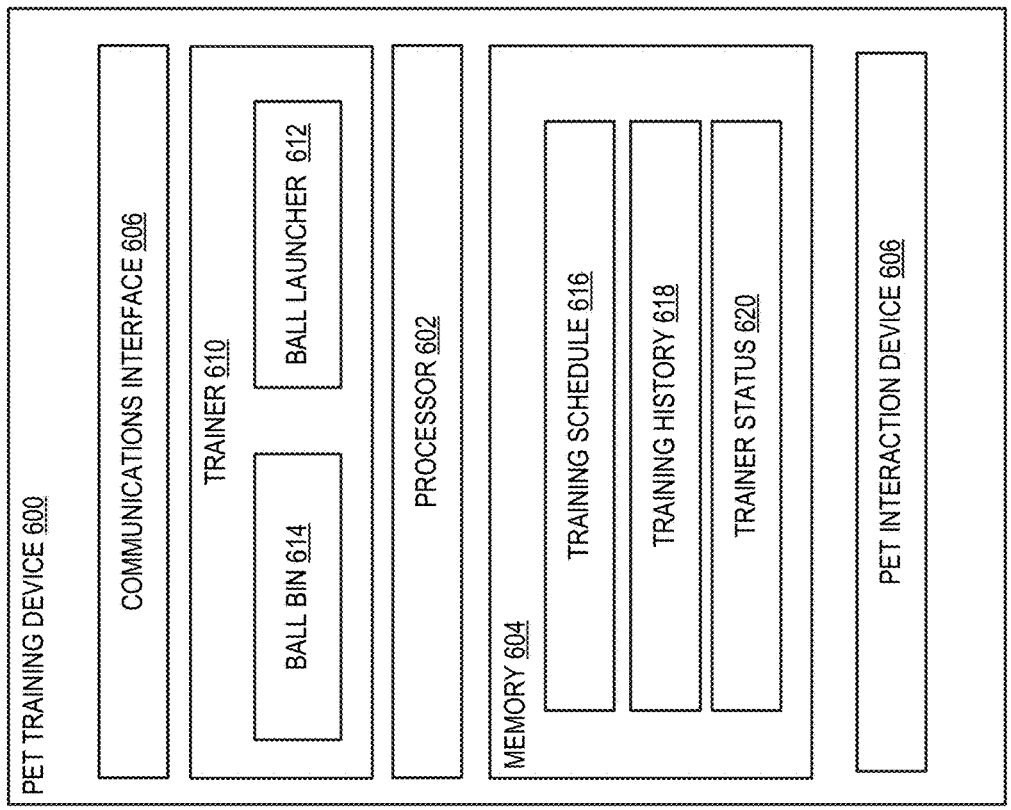
FIG. 6 depicts an exemplary pet training device, which is an example of the pet device of FIG. 1, in embodiments.

FIG. 6 depicts an exemplary pet training device 600, which is an example of pet device 106 of FIG. 1, in embodiments. Pet training device 600 includes a processor 602 in communication with a memory 604, a communications interface 606, and a pet interaction device 608. Processor 602 is an example of processor 148 discussed above. Memory 604 is an example of memory 150 discussed above. Communications interface 606 is an example of communications interface 152 discussed above. Pet interaction device 608 is an example of pet interaction device 154 discussed above. In embodiments, pet interaction device 608 may be a camera capable of filming (image and/or video) the pet training (e.g. playing).

Pet training device 600 may further include a trainer 610. Trainer 610 may be a toy, and in embodiments include a motorized ball launcher 612 for launching balls supplied thereto from a ball bin 614. The pet 110 may have access to the ball bin 614 such that the pet can resupply the ball bin 614 during training. Ball bin 612 may have a measurement system capable of determining how many balls are loaded into, or remaining in the bin 612.

Memory 604 may store one or more of a training schedule 616, training history 618, and trainer status 620. Training schedule 616 is an example of configuration settings 136, discussed above, and may be a customized setting according to the owner's 108 desires based on the breed of pet 110. Training schedule 616 may be a modified preliminary schedule based on one or more of pet database 124, product database 126 and community database 128. For example, an owner may be recommended to have the pet 110 play for 45 minutes a day based on product database 126 and pet database 124, but community database 128 may indicate that pets seem happier when they play 1 hour a day. Thus, owner 108, via application 146 may control trainer 600 to operate for 1 hour a day instead of the recommended 45 minutes a day.

Training history 618 may be a list of past training events by pet 110. In embodiments, training history 618 may include information obtained from pet interaction device 608, such as an image, video, sound clip, or other interaction with pet 110. Training history 618 may be transmitted, via communications interface 606, to owner device 104 via third communication channel 116 (and/or through other pet devices 106 that are connected in same home network and System 100 via fourth and third communication channel 117, 116). In embodiments, training history 618 may be transmitted to pet activity server 102 via second communications channel 114 for storage within owner database 130 as current pet activity 134 (and optional transmission to owner device 104 via first communication channel 112 or third communication channel 116 for storage as pet activity history 216).

Trainer status 620 may be an indication of how much many balls are located in ball bin 614. For example, a measurement system may identify the number of balls therein and provide an indication of the remaining balls left. Therefore, if trainer 600 is empty such that it cannot performed the desired training schedule 616, the owner 108 is advised thereof. In embodiments, trainer status 620 may be transmitted to owner device 104 for notification that the trainer device 600 needs to be refilled when the bin status 620 indicates that the number of balls within ball bin 614 is below a predefined threshold.

Figure 7:
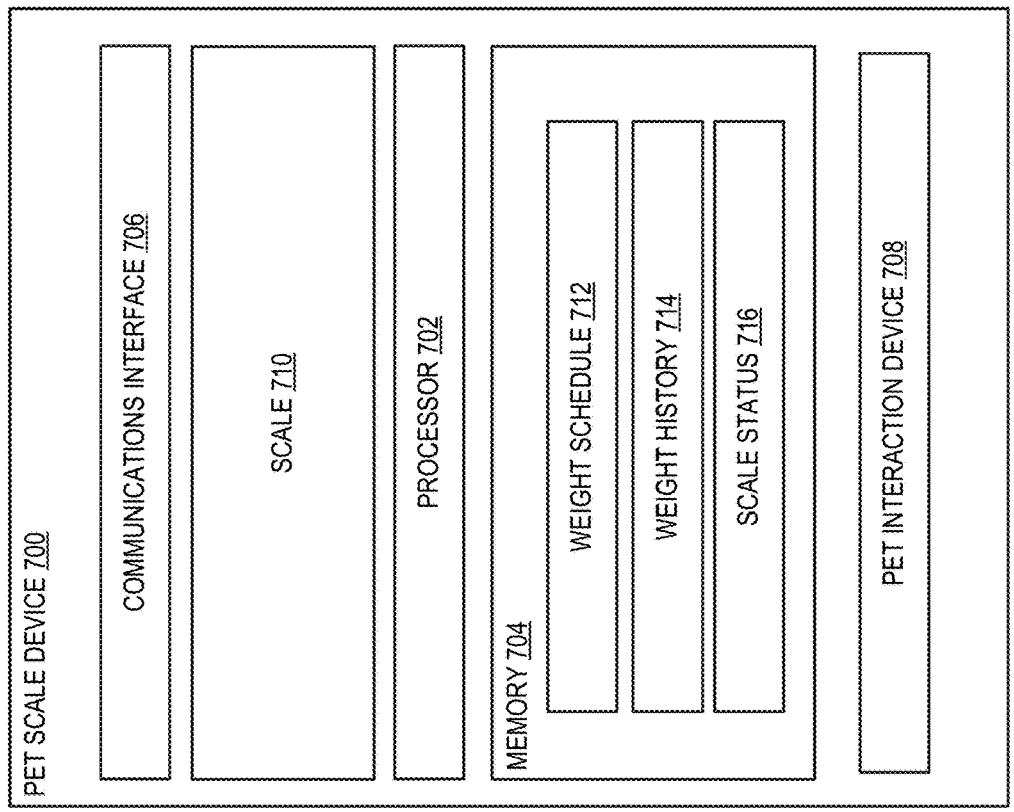
FIG. 7 depicts an exemplary pet scale device, which is an example of the pet device of FIG. 1, in embodiments.

FIG. 7 depicts an exemplary pet scale device 700, which is an example of pet device 106 of FIG. 1, in embodiments. Pet scale device 700 includes a processor 702 in communication with a memory 704, a communications interface 706, and a pet interaction device 708. Processor 702 is an example of processor 148 discussed above. Memory 704 is an example of memory 150 discussed above. Communications interface 706 is an example of communications interface 152 discussed above. Pet interaction device 708 is an example of pet interaction device 154 discussed above. In embodiments, pet interaction device 708 may be a camera capable of filming (image and/or video) the pet being weighed.

Pet scale device 700 may further include a scale 610. Scale 710 may be located in relationship to one of the other devices discussed herein with respect to FIGS. 3-6, and 8-9 such that the pet 110 is enticed to stand thereon. For example, scale 710 may be located in front of a food, treat, or water bin of devices 300, 400, 500 respectively such that the pet 110 stands on scale 710 when using devices 300, 400, and/or 500.

Memory 704 may store one or more of a weight schedule 712, weight history 714, and scale status 716. Weight schedule 712 is an example of configuration settings 136, discussed above, and may be a customized setting according to the owner's 108 desires based on the breed of pet 110. Weight schedule 712 may be a modified preliminary schedule based on one or more of pet database 124, product database 126 and community database 128. For example, an owner may be recommended to have the pet 110 weighed once a day based on pet database 124, but community database 128 may indicate that pet weights are more accurate when weighed twice a day. Thus, owner 108, via application 146 may control scale device 700 to weigh pet 110 twice a day instead of the recommended once per day.

Weight history 714 may be a list of past weights of pet 110. In embodiments, weight history 714 may include information obtained from pet interaction device 708, such as an image, video, sound clip, or other interaction with pet 110. Weight history 714 may be transmitted, via communications interface 706, to owner device 104 via third communication channel 116 (and/or through other pet devices 106 that are connected in same home network and System 100 via fourth and third communication channel 117, 116). In embodiments, weight history 714 may be transmitted to pet activity server 102 via second communications channel 114 for storage within owner database 130 as current pet activity 134 (and optional transmission to owner device 104 via first communication channel 112 or third communication channel for storage as pet activity history 216).

Scale status 716 may be an indication of how scale 710 is operating. For example, scale status 716 may indicate that scale 710 is low on battery, or that scale 710 appears to be out of location because it is not being used by pet 110 for a predetermined amount of time.

Figure 8:
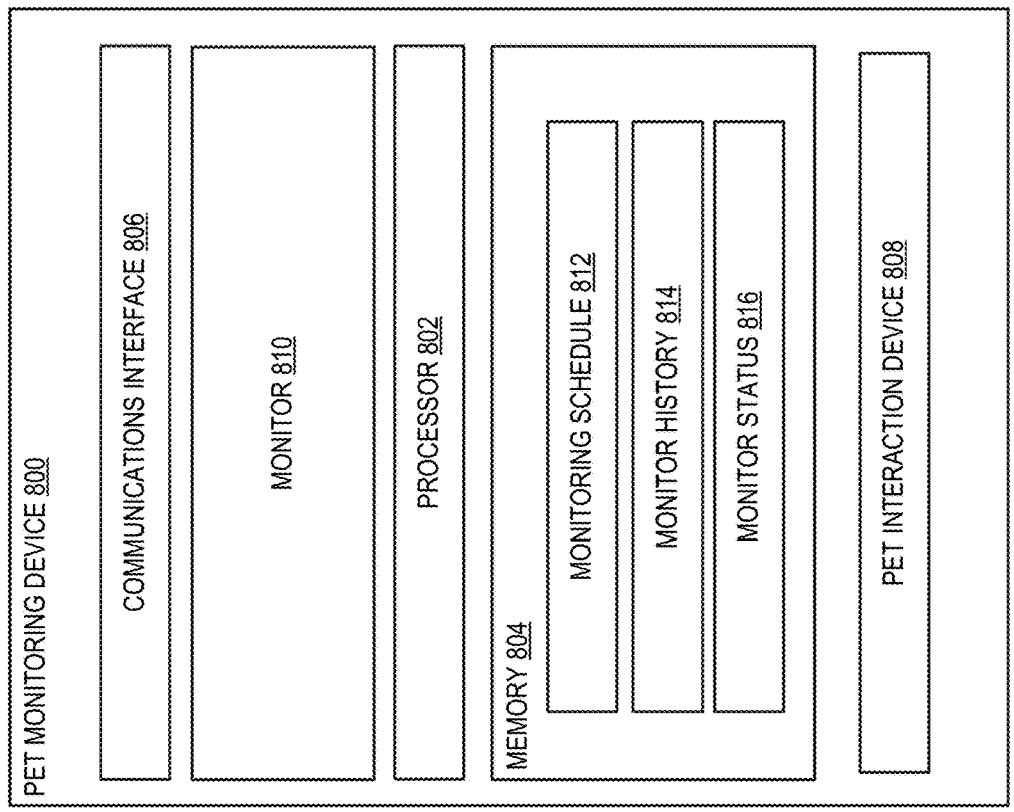
FIG. 8 depicts an exemplary pet monitoring device, which is an example of the pet device of FIG. 1, in embodiments.

FIG. 8 depicts an exemplary pet monitoring device 800, which is an example of pet device 106 of FIG. 1, in embodiments. Pet monitoring device 800 includes a processor 802 in communication with a memory 804, a communications interface 806, and a pet interaction device 808. Processor 802 is an example of processor 148 discussed above. Memory 804 is an example of memory 150 discussed above. Communications interface 806 is an example of communications interface 152 discussed above. Pet interaction device 808 is an example of pet interaction device 154 discussed above. In embodiments, pet interaction device 808 may be a camera capable of filming (image and/or video) the pet being weighed, or performing pet facial identification, in embodiments.

Pet monitoring device 800 may further include a monitor 810. Monitor 810 may be a camera or other monitoring device such as an RFID tag/scanner capable of identifying where pet 110 is located within the owner's 108 dwelling. In embodiments, monitor 810 may be a passive infrared sensor capable of monitoring movement throughout the owner's dwelling via motion detection.

Memory 804 may store one or more of a monitoring schedule 812, monitoring history 814, and monitor status 816. Monitoring schedule 812 is an example of configuration settings 136, discussed above, and may be a customized setting according to the owner's 108 desires based on the breed of pet 110. Monitoring schedule 812 may be a modified preliminary schedule based on one or more of pet database 124, product database 126 and community database 128. For example, an owner may be recommended to film the pet 110 when sleeping. But instead, owner 108, via application 146 may control monitor device 800 to monitor pet 110 at any time during the day.

Monitoring history 814 may be a list or database of monitor events of pet 110. In embodiments, monitor history 814 may include a plurality of clips of pet 110 walking in a viewing area of monitor 810. Monitor history 814 may be transmitted, via communications interface 806, to owner device 104 via third communication channel 116 (and/or through other pet devices 106 that are connected in same home network and System 100 via fourth and third communication channel 117, 116). In embodiments, monitor history 814 may be transmitted to pet activity server 102 via second communications channel 114 for storage within owner database 130 as current pet activity 134 (and optional transmission to owner device 104 via first communication channel 112 or third communication channel 116 for storage as pet activity history 216).

Monitor status 816 may be an indication of how monitor 810 is operating. For example, monitor status 816 may indicate that monitor 810 is low on battery, or that monitor 810 appears to be out of location because it is not "seeing" pet 110 for a predetermined amount of time.

Figure 9:
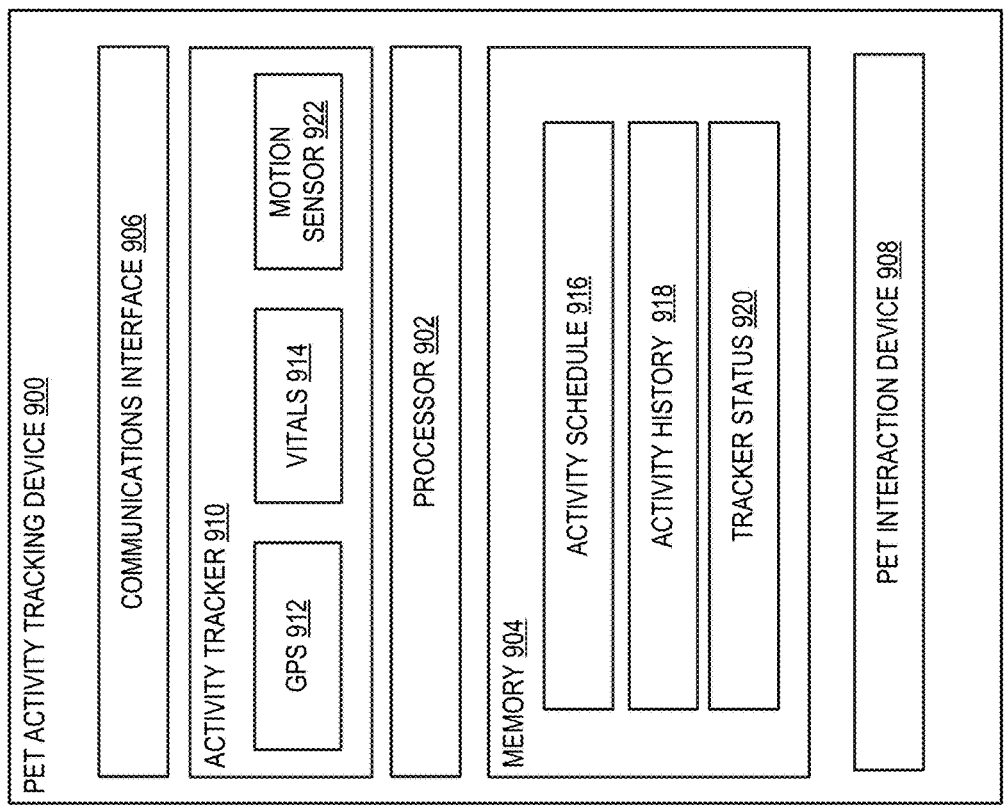
FIG. 9 depicts an exemplary pet activity tracking device, which is an example of the pet device of FIG. 1, in embodiments.

FIG. 9 depicts an exemplary pet activity tracking device 900, which is an example of pet device 106 of FIG. 1, in embodiments. Pet activity tracking device 900 includes a processor 902 in communication with a memory 904, a communications interface 906, and a pet interaction device 908. Processor 902 is an example of processor 148 discussed above. Memory 904 is an example of memory 150 discussed above. Communications interface 906 is an example of communications interface 152 discussed above. Pet interaction device 908 is an example of pet interaction device 154 discussed above.

Pet activity tracking device 900 may further include an activity tracking 910. Activity tracking 910 may include one or more of a tracking module 912 (such as GPS), motion sensor 922 and a vitals monitor 914, such as a heart rate and temperature sensor.

Memory 904 may store one or more of activity schedule 916, activity history 918, and activity tracker status 920. Activity schedule 916 is an example of configuration settings 136, discussed above, and may be a customized setting according to the owner's 108 desires based on the breed of pet 110. Activity schedule 916 may be a modified preliminary schedule based on one or more of pet database 124, product database 126 and community database 128. For example, an owner may be recommended to have the pet out of the house for 2 hours a day. But instead, owner 108, via application 146 may control activity tracking device 900 to track the pet's location to ensure it is out of the house for 3 hours a day. Moreover, the vitals from vitals monitor 914 can be tracked to ensure the pet is getting a certain amount of exercise.

Activity history 918 may be a list or database of activity events of pet 110. In embodiments, activity history 918 may include a list of readings from GPS 912, vitals monitor 914, and/or motion sensor 922. Activity history 918 may be transmitted, via communications interface 906, to owner device 104 via third communication channel 116 (and/or through other pet devices 106 that are connected in same home network and System 100 via fourth and third communication channel 117, 116). In embodiments, activity history 918 may be transmitted to pet activity server 102 via second communications channel 114 for storage within owner database 130 as current pet activity 134 (and optional transmission to owner device 104 via first communication channel 112 or third communication channel 116 for storage as pet activity history 216).

Activity status 920 may be an indication of how activity tracking device 900 is operating. For example, activity status 920 may indicate that tracker 910 is low on battery, or that tracker 910 appears to be out of location because it is not obtaining information about pet 110 for a predetermined amount of time. Moreover, tracker status 920 may be transmitted to other devices 106 to provide control thereof. For example, if activity schedule 916 requires 0.5 hours of raised heart rate a day, and activity history 918 only indicates 0.25 hours, then tracker status 920 may be sent to pet training device 600 to turn the trainer 610 "on" such that the pet 110 is enticed to play with training device 600 thereby raising the pet's heart rate.

Figure 10:
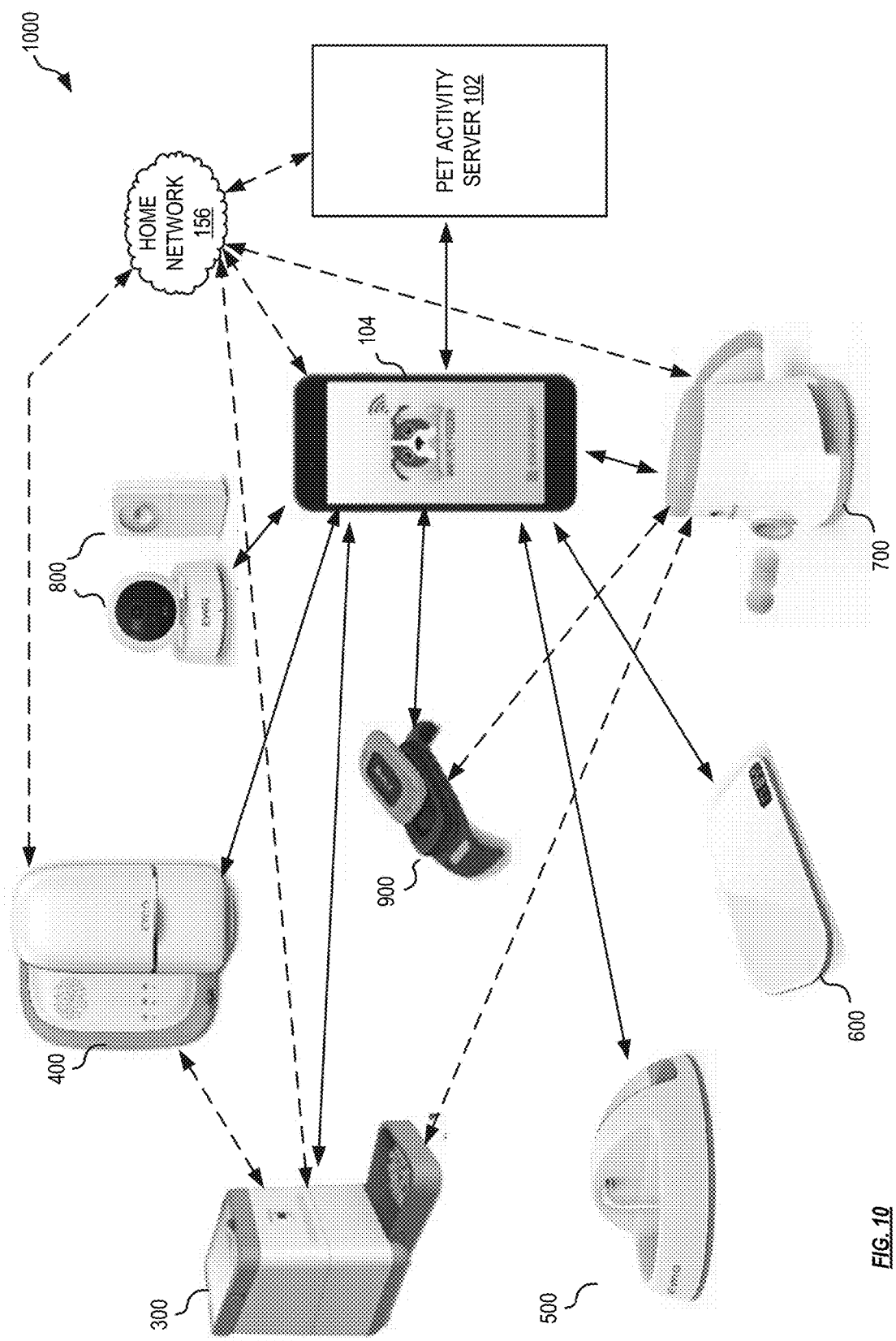
FIG. 10 depicts an example of system including a plurality of devices owned by an owner, in an embodiment.

FIG. 10 depicts an example of system 1000 including a plurality of devices owned by an owner, in an embodiment. For example, an owner (e.g. owner 108) may utilize device 104 to control seven devices that interact with the owner's pet (e.g. pet 110). For example, system 1000 is shown with feeder device 300, treat device 400, water device 400, scale 600, trainer 700, monitor 800, and activity tracker 900 (that may be worn by pet 110). Each of these devices is controlled by owner device 104, which interacts with pet activity server 102 to obtain a preliminary schedule for each device. Owner then utilizes device 104 to modify the preliminary schedule and set desired control settings for each device 104. Accordingly, the owner is provided the benefit of having a control setting that is not only (1) based on breed and pet characteristics because of the preliminary schedule, but (2) customized based on owner preferences because of the owner's modifications thereto.

Each device may be connected, wirelessly or wired, such that each device may communicate with each other device. Accordingly, this provide an additional level of control such that if activity tracker 900 notices that pet has not had enough activity, trainer 700 may be activated to increase the activity of the pet. Moreover, if the pet is not in a desired location, the treat and/or food devices 400, 300 may be activated to entice the pet to go to a different location. Moreover, if scale 600 identifies that pet 110 is overweight, it may automatically communicate with feeder device 300 to change the feeding schedule 316 thereby putting the pet on a diet. Dashed lines within FIG. 10 represent interconnection between devices 106 (and device 104 and server 102) via relay through home network 156. It should be appreciated that any device 106 can connect to any other component within system 100, 1000, via home network 156 or other commination interfaces.

The embodiments herein provide many advantages. For example, products can be added to the ecosystem (e.g. system 100) with ease because the centralized pet activity server 102, and product database 126, need just be updated. Then the owner is automatically notified of additional products and changes to products through interaction with owner device 104. Further, because each device 106 may include a communication interface (including RF link, ZigBee, cellular, Bluetooth and/or Wi-Fi connectivity), the owner is capable of controlling the devices remotely. By utilizing various operating systems, such as Android and iOS, the components of system 100 may be updated with ease, and pet application 126 can be installed on any device capable of running an Android and/or iOS application. By monitoring feeding habits, such as number of treats, amount of food, amount of water intake, etc. the owner is provided a real-time landscape of the pet's health. Moreover, the owner's day-to-day monitoring of food supply is simplified because system 100 is capable of automatically determining when the owner needs to buy more food/treats/toys for the pet, or refill the pet's water. Owners are able to see and communicate with their pet, even when remote therefrom, through the pet interaction devices and even play with their pet via the pet trainer devices, thereby increasing the pet's mood and reducing separation anxiety. By implementing a variety of devices, the owner is capable of monitoring the entire health of the pet, not just food or activity, or watering. Therefore, the owner is able to visualize and interpret the entire pet's health as opposed to just one individual aspect thereof. Further, interconnectivity between each device allows the system to control the actions and location of the pet without the owner being present. For example, by automatically activating the treat dispenser, even if the owner has no knowledge thereof, the pet may be enticed to go from one room to the other room having the treat dispenser therein. Moreover, activation of the trainer system may entice the pet to be more active if it has not been active enough within a predefined period of time.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A pet monitoring system, comprising:
   a pet activity server including a pet database defining preliminary schedule for a variety of pets;
   an owner device in communication with the pet activity server, the owner device running a pet application, the preliminary schedule for a specific pet of the variety of pets accessible by the pet application and modifiable based on owner modifications obtained at the owner device via interaction by the owner with the pet application; and,
   a plurality of pet devices,
      one of the plurality of pet devices including configuration settings, the configuration settings based on the preliminary schedule and the owner modifications,
      one of the plurality of the pet devices including a pet activity tracker device including a vitals monitor wearable by the pet and configured to detect vitals of the pet,
      another of the plurality of pet devices being a pet training device, the pet activity tracker device in communication with the pet training device, the pet activity tracker device altering configuration settings of the pet training device when the vitals monitor indicates that the pet activity is below a predetermined threshold.

2. The pet monitoring system of claim 1, at least two of the pet devices being in communication with each other such that interaction by the pet with one of the pet devices automatically triggers a change of the configuration settings of the other pet device.

3. The pet monitoring system of claim 2, the owner device including a processor and memory operating via an Android or iOS operating system.

4. The pet monitoring system of claim 1, the pet activity tracker device being a GPS tracker.

5. The pet monitoring system of claim 1, one of the plurality of pet devices being a pet interaction device capable of capturing interaction of the pet with the pet device and transmitting said interaction to the pet activity server for storage within an owner database and subsequent transmission to the owner device.

6. The pet monitoring system of claim 5, the interaction device being one or more of a camera, microphone, and speaker.

* * * * *